United States Patent
Tsuchiya (10) Patent No.: US 11,486,108 B2
(45) Date of Patent: Nov. 1, 2022

(54) PNEUMATIC FENDER

(71) Applicant: THE YOKOHAMA RUBBER CO., LTD., Tokyo (JP)

(72) Inventor: Kouko Tsuchiya, Hiratsuka (JP)

(73) Assignee: THE YOKOHAMA RUBBUR CO., LTD., Tokyo (JP)

( * ) Notice: Subject to any disclaimer, the term of this patent is extended or adjusted under 35 U.S.C. 154(b) by 0 days.

(21) Appl. No.: 17/413,732

(22) PCT Filed: Nov. 12, 2019

(86) PCT No.: PCT/JP2019/044350
§ 371 (c)(1),
(2) Date: Jun. 14, 2021

(87) PCT Pub. No.: WO2020/144934
PCT Pub. Date: Jul. 16, 2020

(65) Prior Publication Data
US 2022/0042264 A1     Feb. 10, 2022

(30) Foreign Application Priority Data
Jan. 9, 2019   (JP) .............................. JP2019-001649

(51) Int. Cl.
*E02B 3/26*      (2006.01)
*B32B 25/02*    (2006.01)
(Continued)

(52) U.S. Cl.
CPC ................ *E02B 3/26* (2013.01); *B32B 25/02* (2013.01); *B32B 25/042* (2013.01); *B32B 25/12* (2013.01);
(Continued)

(58) Field of Classification Search
None
See application file for complete search history.

(56) References Cited

U.S. PATENT DOCUMENTS 3,500,888 A * 3/1970 Boileau ................. B60C 9/0042
152/557
3,881,974 A * 5/1975 de Zarauz .............. B29D 30/20
156/123

(Continued)

FOREIGN PATENT DOCUMENTS

JP       H06-33433 A       2/1994
JP       2006-291628 A    10/2006
(Continued)

*Primary Examiner* — Kevin R Kruer
(74) *Attorney, Agent, or Firm* — Carrier Blackman & Associates, P.C.; Joseph P. Carrier; William D. Blackman (57) ABSTRACT

Reinforcing layers each have a cord angle set to 25° or greater and 45° or less when a body is in a neutral state. When the body is loaded with a specified internal pressure, intermediate rubber layers disposed between adjacent sets in which cords of the reinforcing layers extend in an intersecting direction are shear-deformed, the cord angle increases approximately to a stable angle of repose, and the expanded body maintains a predetermined shape. In each of the sets being formed of two reinforcing layers layered adjacently, the cords of the reinforcing layers extend in an identical direction at the predetermined cord angle. Since substantially no shear force acts on the intermediate rubber layers disposed between the reinforcing layers, the resistance when expanding the body decreases. This provides a pneumatic fender that expands more smoothly and ensures a predetermined shape when a body is loaded with a specified internal pressure.

11 Claims, 5 Drawing Sheets

(51) Int. Cl.
  *B32B 25/12* (2006.01)
  *B32B 25/04* (2006.01)
  *B32B 25/14* (2006.01)
  *B32B 25/18* (2006.01)
  *B63B 59/02* (2006.01)

(52) U.S. Cl.
  CPC .............. *B32B 25/14* (2013.01); *B32B 25/18* (2013.01); *B63B 59/02* (2013.01); *B32B 2250/05* (2013.01); *B32B 2250/248* (2013.01); *B32B 2307/732* (2013.01); *B32B 2605/00* (2013.01); *Y02A 30/30* (2018.01)

(56) References Cited

U.S. PATENT DOCUMENTS

| | | | | |
|---|---|---|---|---|
| 4,176,858 A | * | 12/1979 | Kornhauser | B60R 19/20 280/734 |
| 4,283,241 A | * | 8/1981 | Hollmann | B29D 30/0681 156/126 |
| 4,296,705 A | * | 10/1981 | Uruta | F16F 9/0409 114/219 |
| 4,657,058 A | * | 4/1987 | Kabe | B60C 9/08 152/556 |
| 5,117,864 A | * | 6/1992 | Byers | B25B 27/24 123/90.1 |
| 5,560,312 A | * | 10/1996 | McPherson | B63B 59/02 114/219 |
| 9,365,992 B2 | * | 6/2016 | Yamada | E02B 3/26 |
| 9,499,243 B2 | * | 11/2016 | Sakakibara | B63B 59/02 |
| 10,023,278 B1 | * | 7/2018 | Smith | B63B 43/02 |
| 10,639,934 B2 | * | 5/2020 | Celik | B60C 9/2009 |
| 2008/0023119 A1 | * | 1/2008 | Jin | B60C 15/06 152/554 |
| 2013/0105056 A1 | * | 5/2013 | Hubbell | B29D 30/305 152/553 |
| 2015/0057414 A1 | * | 2/2015 | Tomoi | C08L 77/02 525/183 |
| 2015/0091226 A1 | * | 4/2015 | Yamada | E02B 3/26 267/140 |
| 2015/0114274 A1 | | 4/2015 | DeBruijn | |
| 2016/0083056 A1 | * | 3/2016 | Sakakibara | E02B 3/26 114/219 |
| 2016/0194064 A1 | * | 7/2016 | Okuno | B32B 7/00 114/219 |
| 2017/0016195 A1 | * | 1/2017 | Yamada | F16K 17/02 |
| 2017/0113488 A1 | * | 4/2017 | Iwamura | B60C 1/00 |
| 2017/0114590 A1 | * | 4/2017 | Shinozaki | G02B 5/00 |
| 2018/0202474 A1 | * | 7/2018 | Oono | F15B 15/103 |
| 2020/0114688 A1 | * | 4/2020 | Kyo | B60C 9/2204 |
| 2020/0399847 A1 | * | 12/2020 | Tsuchiya | E02B 3/26 |
| 2022/0042264 A1 | * | 2/2022 | Tsuchiya | E02B 3/26 |

FOREIGN PATENT DOCUMENTS

| | | |
|---|---|---|
| JP | 2013-231297 A | 11/2013 |
| JP | 2014-218866 A | 11/2014 |

\* cited by examiner

PNEUMATIC FENDER

TECHNICAL FIELD

The present invention relates to a pneumatic fender and particularly relates to a pneumatic fender that can expand more smoothly and ensure a predetermined shape when loaded with a specified internal pressure.

BACKGROUND ART

Pneumatic fenders typically include a body provided with a bowl-shaped hemispherical portion at both ends of a cylindrical body portion, and the body is composed of a plurality of reinforcing layers layered between an inner layer rubber and an outer layer rubber. In the body portion, each of the reinforcing layers is formed of a number of cords bunched in parallel, and the cords are arranged at a predetermined cord angle with respect to a cylinder axial direction. The cords of reinforcing layers layered adjacently are in an intersecting state (a so-called bias structure). When the cord angle in a neutral state where the body is not expanded is set to approximately the angle of repose (54° to 55°), the size (length and outer diameter) of the body does not change so much even when the inside of the body is filled with air and loaded with the specified internal pressure.

A structure that can be expanded more when the body is loaded with a specified internal pressure has also been proposed, by setting a cord angle of each of reinforcing layers of a body portion to 15° to 45° in the neutral state where the body is not expanded (see Patent Document 1). In this structure, when the body is loaded with a specified internal pressure, the body expands and is maintained in a predetermined shape until the cord angle of each of the reinforcing layers of the body portion reaches approximately the angle of repose. However, when the body expands, a shear force acts on an intermediate rubber layer between the reinforcing layers layered adjacently. As a result, each of the intermediate rubber layers becomes a large resistance when the body is expanded, which is disadvantageous in expanding the body smoothly.

CITATION LIST

Patent Literature

Patent Document 1: JP 2013-231297 A

SUMMARY OF INVENTION

Technical Problem

An object of the present invention is to provide a pneumatic fender that can expand more smoothly and ensure a predetermined shape when loaded with a specified internal pressure.

Solution to Problem

In order to attain the object, the pneumatic fender according to an embodiment of the present invention is a pneumatic fender including a body including a body portion having a cylindrical shape, and a hemispherical portion having a bowl shape and connected to both ends of the body portion, the body being composed of a plurality of reinforcing layers layered between an inner layer rubber and an outer layer rubber, in the body portion, each of the reinforcing layers being formed of a number of cords bunched and extending in parallel at a predetermined cord angle with respect to a cylinder axial direction, an intermediate rubber layer being disposed between the reinforcing layers, the pneumatic fender having a structure in which two reinforcing layers being layered adjacently in the body portion form one set, a plurality of the sets are provided, each of the sets is composed of different reinforcing layers, in each of the sets, the cords of the reinforcing layers extend in an identical direction, and in the sets layered adjacently, the cords of the reinforcing layers extend in an intersecting direction, and the cord angle of each of the reinforcing layers of the body portion being set to 25° or greater and 45° or less in a neutral state where the body is not expanded.

Advantageous Effects of Invention

According to the present invention, the cord angle of each reinforcing layer of the body portion is set to 25° or greater and 45° or less in a neutral state where the body is not expanded. Therefore, when the body is filled with air to be loaded with a specified internal pressure, the cord angle of each reinforcing layer of the body portion increases to a stable angle of repose, and the expanded body can be secured to a predetermined shape. Here, the cords of each of the reinforcing layers in each of the sets extend in an identical direction at a predetermined cord angle. Therefore, substantially no shear force acts on the intermediate rubber layers disposed between the reinforcing layers when the body expands. In each of the sets layered adjacently, the cords of the reinforcing layers extend in an intersecting direction. Therefore, when the body expands, the shear force acts substantially only on the intermediate rubber layers disposed between sets layered adjacently, among the intermediate rubber layers present in the layered structure of the sets. Therefore, the resistance when expanding the body is reduced, which is advantageous in smoothly expanding the body.

DESCRIPTION OF EMBODIMENTS

A pneumatic fender according to embodiments of the present invention will be described below with reference to the drawings.

Figure 2:
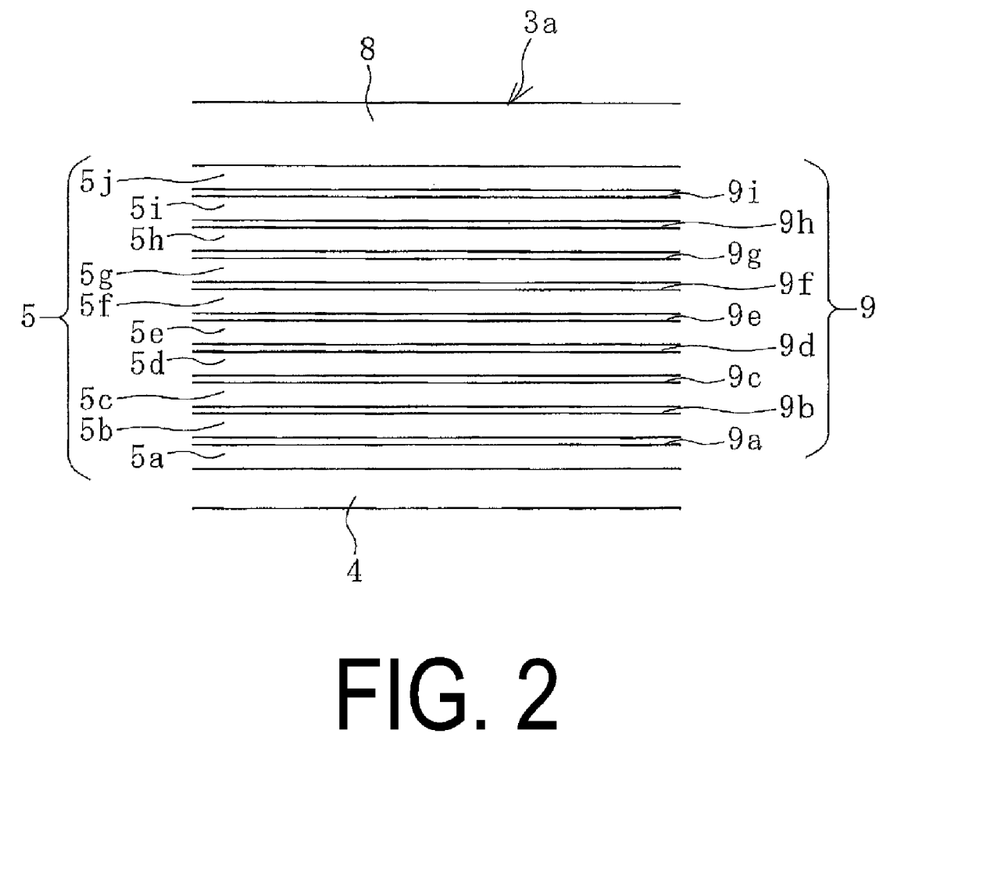
FIG. 2 is an explanatory diagram in a cross-sectional view illustrating a portion of a body portion of the pneumatic fender of FIG. 1 at an enlarged scale.
Figure 3:
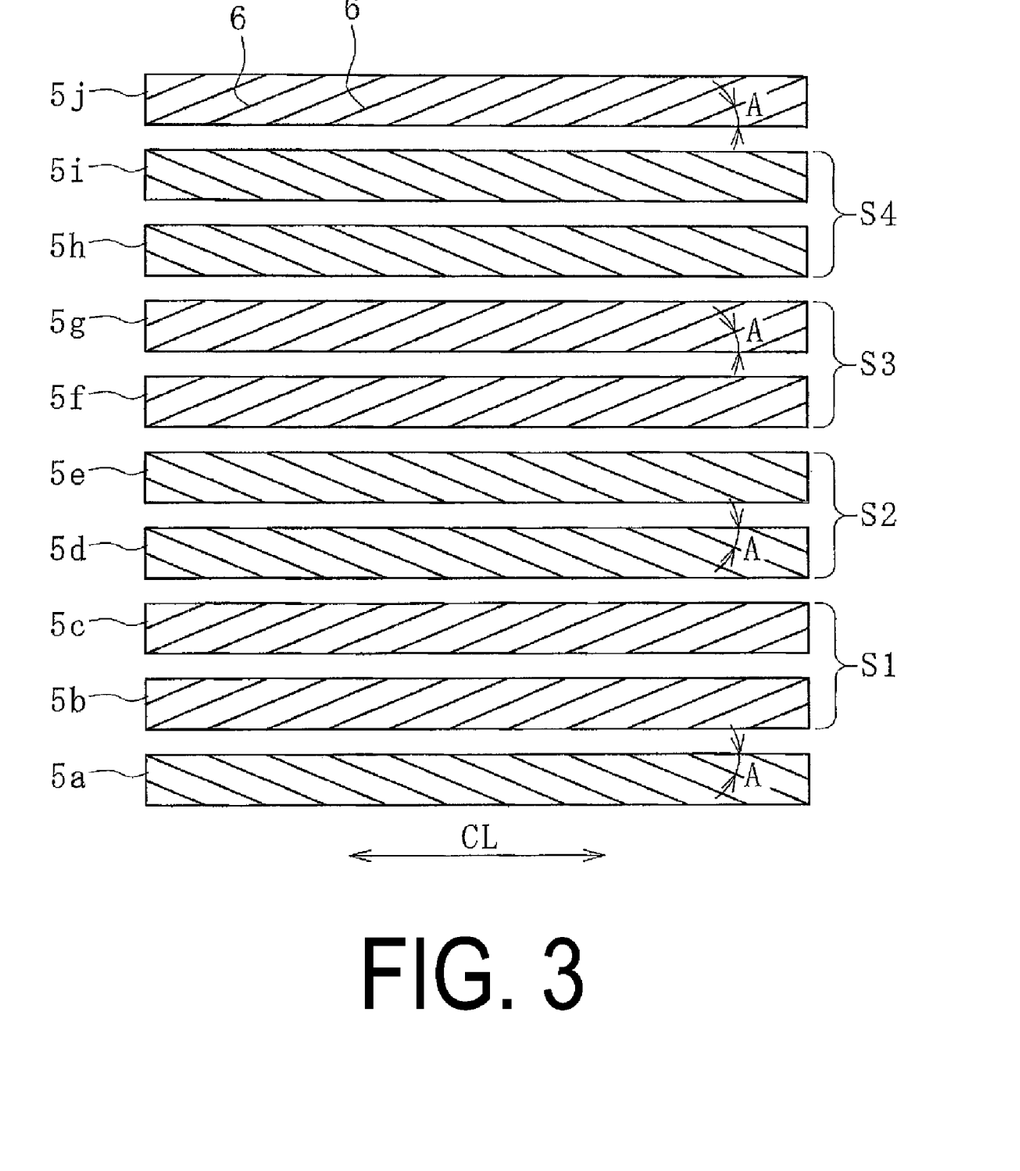
FIG. 3 is an explanatory diagram in a plan view illustrating an extension direction of the cords of reinforcing layers.

A pneumatic fender 1 (hereinafter referred to as a fender 1) according to the present invention illustrated in FIGS. 1 to 3 includes: a body 2 including a bowl-shaped hemispherical portion 3b connected to both ends of a cylindrical body portion 3a; and a mouthpiece portion 10 provided on the body 2. In this embodiment, the mouthpiece portion 10 is provided on one of the hemispherical portions 3b, but may be provided on both hemispherical portions 3b.

The body 2 is formed by layering a plurality of reinforcing layers 5 between an inner layer rubber 4 and an outer layer rubber 8. In this embodiment, ten reinforcing layers 5 (5a to 5j) are layered. The number of layers of the reinforcing layers 5 is, for example, in a range of from 6 or greater to 18 or less. Each of the reinforcing layers 5 is formed of a number of cords 6. Steel cords, organic fiber cords, and the like are used as the cords 6. An outer diameter of the cord 6 is, for example, in a range of approximately from 0.5 mm or greater to 1.5 mm or less.

An intermediate rubber layer 9 (9a to 9i) is disposed between each of the reinforcing layers 5. As the rubber forming the intermediate rubber layer 9, for example, natural rubber, butyl rubber, styrene butadiene rubber, acrylonitrile butadiene rubber, and the like are used. The thickness of the intermediate rubber layer 9 is, for example, less than 1 mm in a neutral state where the body 2 is not expanded, and more preferably from 0.2 mm or greater to 0.6 mm or less.

The neutral state where the body 2 is not expanded is a state where tension is not substantially generated in the cord 6, and air is injected into the body 2, but the internal pressure thereof is slightly higher than the atmospheric pressure (for example, 10 kPa). Furthermore, the body portion 3a has a cylindrical shape, and the hemispherical portion 3b has a bowl shape. The outer diameter of the body portion 3a in the neutral state where the body 2 is not expanded is, for example, in a range of from 2 m or greater to 8 m or less.

As the rubber forming the inner layer rubber 4, for example, natural rubber, butyl rubber, styrene butadiene rubber, acrylonitrile butadiene rubber, and the like are used. As the rubber forming the outer layer rubber 8, for example, natural rubber, styrene butadiene rubber, acrylonitrile butadiene rubber, ethylene propylene rubber, and the like are used. In the neutral state where the body 2 is not expanded, the thickness of the inner layer rubber 4 is, for example, in a range of from 2 mm or greater to 5 mm or less, and the thickness of the outer layer rubber 8 is, for example, in a range of from 3 mm or greater to 12 mm or less.

In the body portion 3a, each of the reinforcing layers 5 is formed of a number of cords 6 that are bunched and extend in parallel to a cylinder axial direction CL at a cord angle A. As illustrated in FIG. 3, in the fender 1, two reinforcing layers layered adjacently form one set S and a plurality of the sets S (S1 to S4) are provided. The respective sets S are composed of different reinforcing layers 5. In this embodiment, four sets S1 to S4 are composed of eight reinforcing layers 5b to 5i other than the innermost reinforcing layer 5a and the outermost reinforcing layer 5j. The number of sets S is, for example, approximately 3 to 6 and is preferably plural.

In each of the sets S1, S2, S3, S4 (for each set S), the cords 6 of each reinforcing layer 5 extend in an identical direction at a predetermined cord angle A. In each of the sets S layered adjacently, the cords 6 of the reinforcing layers 5 extend in the intersecting direction at a predetermined cord angle A. In other words, the cords 6 of the reinforcing layers 5 in the sets S1 and S2 extend in the intersecting direction, the cords 6 of the reinforcing layers 5 in the sets S2 and S3 extend in the intersecting direction, and the cords 6 of the reinforcing layers 5 in the sets S3 and S4 extend in the intersecting direction. Thus, the cords 6 of the reinforcing layers 5 in the sets S1 and S3 extend in parallel, and the cords 6 of the reinforcing layers 5 in the sets S2 and S4 extend in parallel.

Specifically, the cords 6 of the reinforcing layers 5b, 5c, 5f, and 5g extend at a cord angle A inclined in an identical direction. The cords 6 of the reinforcing layers 5d, 5e, 5h, and 5i extend at a cord angle A inclined in an identical direction.

Furthermore, the cords 6 of the reinforcing layers 5b, 5c, 5f, and 5g and the cords 6 of the reinforcing layers 5d, 5e, 5h, and 5i extend in mutually intersecting directions. In other words, in the body portion 3a, the cords 6 have a biasing structure with the set S as a unit.

In this embodiment, the cords 6 of the innermost reinforcing layer 5a extend at a cord angle A to be inclined in the direction of intersecting the cords 6 of the reinforcing layer 5b layered adjacent thereto. The cords 6 of the outermost reinforcing layer 5j extend at a cord angle A to be inclined in the direction of intersecting the cords 6 of the reinforcing layer 5i layered adjacent thereto.

In the neutral state where the body 2 is not expanded, the cord angle A of each of the reinforcing layers 5 is set to be not less than 25° and not greater than 45°. More preferably, the cord angle A is set to be not less than 30° and not greater than 35°.

Figure 4:
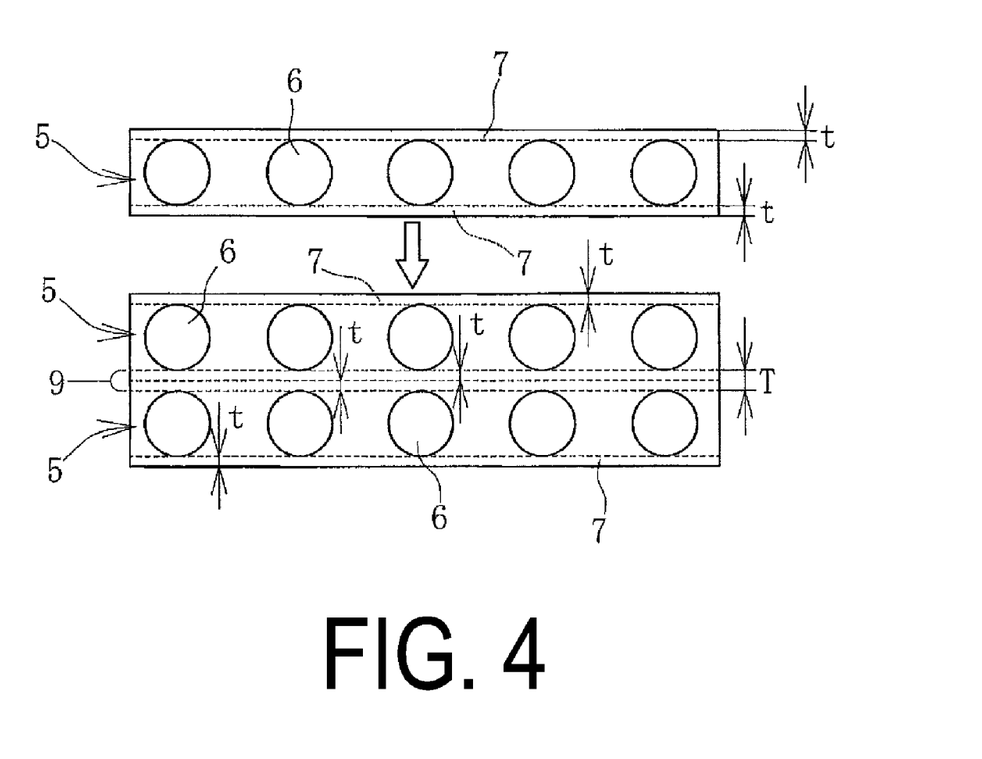
FIG. 4 is an explanatory diagram in a cross-sectional view illustrating a layered state of reinforcing layers at an enlarged scale.

As illustrated in FIG. 4, the cords 6 of each of the reinforcing layers 5 are covered with a coating rubber 7 having a thickness t. Thus, when the reinforcing layers 5 are simply layered when molding the body portion 3a, a thickness T of the intermediate rubber layer 9 between the reinforcing layers 5 is twice the thickness t of the coating rubber 7 (T=2t).

The hemispherical portion 3b may be configured such that the reinforcing layer 5 of the body portion 3a extends up to both end portions in the cylinder axial direction. That is, the entire body 2 may have a bias structure. Alternatively, the hemispherical portion 3b may be formed by alternately layering: a reinforcing layer formed of the cords 6 extending radially around the mouthpiece portion 10; and a reinforcing layer formed of the cords 6 extending in the circumferential direction.

Figure 1:
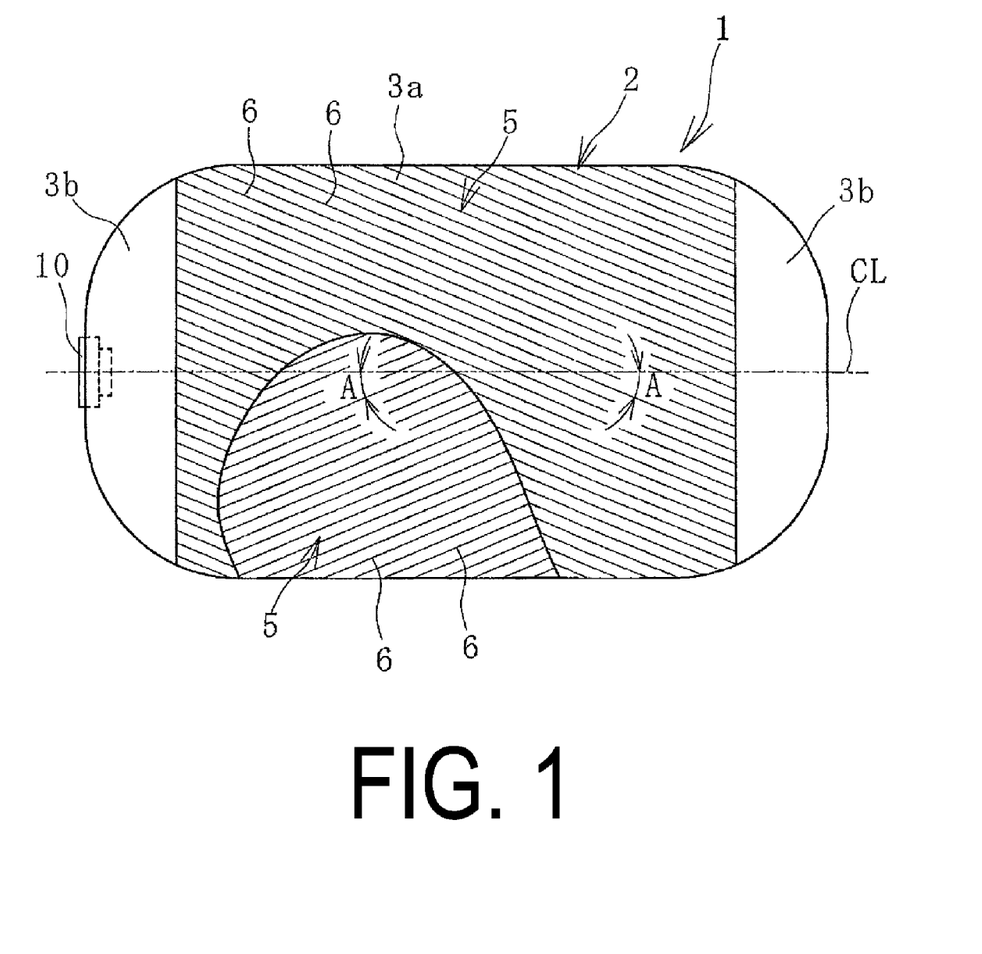
FIG. 1 is an explanatory diagram in a side view illustrating a pneumatic fender according to an embodiment of the present invention in a neutral state where the body is not expanded, with a portion of a member of a body portion being cut away.

When the fender 1 is not used, for example, during storage, transportation, installation, or the like, the internal pressure of the body 2 is set to a low pressure of approximately 10 kPa, and it is brought into a neutral state where the fender 1 is not expanded as illustrated in FIG. 1. Furthermore, the air inside the body 2 is discharged and folded.

Figure 5:
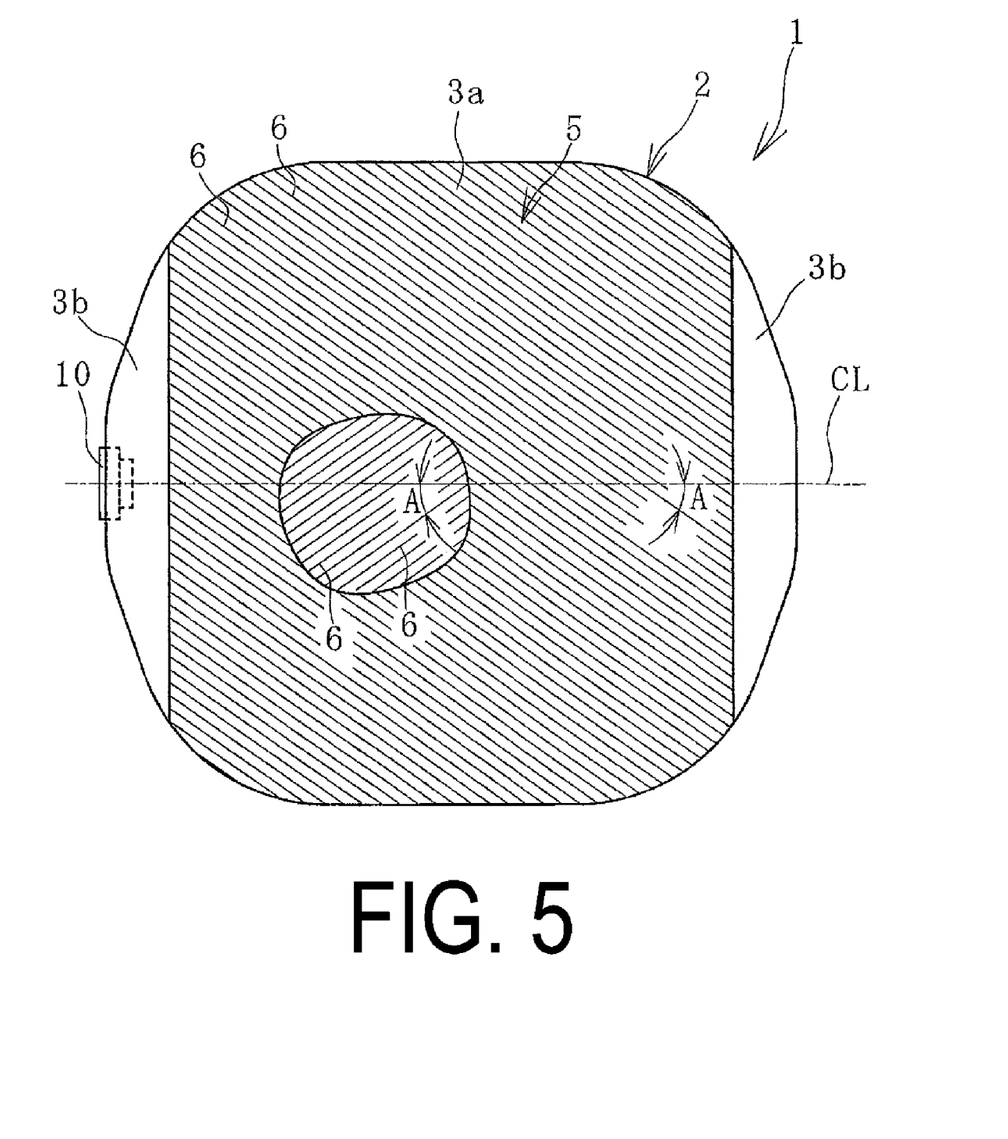
FIG. 5 is an explanatory diagram in a side view illustrating the pneumatic fender of FIG. 1 when the body is loaded with a specified internal pressure and is expanded in a predetermined shape, with a portion of a member of a body portion being cut away.

When the fender 1 is used by being attached to an installation location, the body 2 is expanded and maintained in a predetermined shape as illustrated in FIG. 5. Specifically, the inside of the body 2 is filled with air through a valve provided in the mouthpiece portion 10 to be loaded with a specified internal pressure P. The specified internal pressure P is, for example, approximately from 50 kPa to 100 kPa.

In the process of filling the inside of the body 2 with air to reach the specified internal pressure P, in the body portion 3a, the cord angle A of each of the reinforcing layers 5 will increase to approximately a stable angle of repose (54° to 55°). Here, in each of the sets S, the cords 6 of each of the reinforcing layers 5 extend in an identical direction at a predetermined cord angle A. Therefore, a shear force does not substantially act on the intermediate rubber layers 9b, 9d, 9f, and 9h disposed between the reinforcing layers 5.

On the other hand, the cords 6 of the reinforcing layers 5 of the sets S layered adjacently in the body portion 3a extend in the intersecting direction. Therefore, a shear force acts on the intermediate rubber layers 9c, 9e, and 9g disposed between the sets S. In this embodiment, the intermediate rubber layers 9a and 9i are also shear-deformed. In this manner, when the body 2 is loaded with the specified internal pressure P, the cord angle A of each of the reinforcing layers 5 in the body portion 3a increases to approximately a stable angle of repose (54° to 55°), and the body 2 expands and is maintained in a predetermined shape.

Specifically, when the body 2 expands, noticing the layered structure of the set S, the shear force acts substantially only on the intermediate rubber layers 9c, 9e, and 9g disposed between sets S layered adjacently among the intermediate rubber layers 9b to 9h. Therefore, compared to a case where a shear force acts on all of the intermediate rubber layers 9b to 9h, the resistance when expanding the body 2 is reduced, which is advantageous in smoothly expanding the body 2.

The outer diameter of the body portion 3a can be approximately in the range of from 120% or greater to 150% or less with respect to the neutral state when loaded with the specified internal pressure P. The axial length of the body 2 (the body portion 3a) is approximately in the range of from 95% or greater to 80% or less with respect to the neutral state when loaded with the specified internal pressure P.

If the thickness of the intermediate rubber layer 9 is less than 0.2 mm, the load on the intermediate rubber layers 9 (9c, 9e, 9g), on which the shear force acts when the body 2 expands, becomes excessively large. In addition, when the thickness of the intermediate rubber layer 9 is 1 mm or greater, the weight of the fender 1 becomes excessively large. Therefore, the thickness T of each of the intermediate rubber layers 9 is preferably 0.2 mm or greater and less than 1 mm, and more preferably is 0.2 mm or greater and 0.6 mm.

In addition, when the cord angle A is less than 25° in the neutral state, and when the cord angle A is to be increased to approximately the angle of repose, an excessively large shear stress is generated in the intermediate rubber layers 9c, 9e, 9g and the intermediate rubber layers 9a, 9i, which is not preferable. Therefore, the cord angle A is set to 25° or greater, and more preferably, 30° or greater.

When the cord angle A is greater than 45°, the degree of diameter expansion of the body portion 3a when the body 2 is loaded with the specified internal pressure P from the neutral state is reduced. Therefore, the cord angle A is set to 45° or less, and more preferably, 35° or less.

In this embodiment, the thicknesses T of all of the intermediate rubber layers 9 are identical in the neutral state where the body 2 is not expanded. However, there is no limitation thereto. In the neutral state where the body 2 is not expanded, the thicknesses T of the intermediate rubber layers 9b, 9d, 9f, and 9h disposed between the reinforcing layers 5 of each set S may be set to be smaller than the thicknesses T of the intermediate rubber layers 9c, 9e, and 9g disposed between the adjacently layered sets S. The shear force acts substantially on the intermediate rubber layers 9c, 9e, and 9g when the body 2 expands. According to this specification, the weight can be reduced while ensuring that the body 2 is expanded smoothly to a predetermined shape. Note that the shear force also acts on the intermediate rubber layers 9a, 9i when the body 2 expands, the thicknesses of the intermediate rubber layers 9a, 9i may be identical to those of the intermediate rubber layers 9c, 9e, and 9g.

As illustrated in FIG. 4, when the reinforcing layers 5 having identical specifications (the thicknesses t of the coating rubbers 7) are simply layered during molding of the body portion 3a, the thicknesses T of all of the intermediate rubber layers 9 will be identical. Thus, for example, when the reinforcing layers 5b, 5c belonging to the identical set S are layered, a rubber layer is added between these layers. A rubber layer may be added between the layers of the reinforcing layer 5d and the reinforcing layer 5e, between the layers of the reinforcing layer 5f and the reinforcing layer 5g, and between the layers of the reinforcing layer 5h and the reinforcing layer 5i.

The innermost reinforcing layer 5a and the outermost circumferential reinforcing layer 5j may also have a structure that the layers constitute the set S. However, when the number of reinforcing layers 5 increases, it is disadvantageous in reducing the weight of the fender 1. Therefore, as in this embodiment, the set S may be formed by the reinforcing layers 5b to 5i other than the innermost reinforcing layer 5a and the outermost reinforcing layer 5j as long as pressure resistance as required for the fender 1 can be ensured.

REFERENCE SIGNS LIST

1 Pneumatic fender
2 Body
3a Body portion
3b Hemispherical portion
4 Inner layer rubber
5 (5a to 5j) Reinforcing layer
6 Cord
7 Coating rubber
8 Outer layer rubber
9 (9a to 9i) Intermediate rubber layer
10 Mouthpiece portion
A Cord angle
S (S1, S2, S3, S4) Set of reinforcing layers

The invention claimed is:

1. A pneumatic fender, comprising a body comprising a body portion having a cylindrical shape and a hemispherical portion having a bowl shape and connected to both ends of the body portion, the body being composed of a plurality of reinforcing layers layered between an inner layer rubber and an outer layer rubber, in the body portion, each of the reinforcing layers being formed of a number of cords bunched and extending in parallel at a predetermined cord angle with respect to a cylinder axial direction, intermediate rubber layers being disposed between each of the reinforcing layers which are layered adjacently,
the pneumatic fender having a structure in which two reinforcing layers being layered adjacently with the intermediate rubber layer disposed therebetween in the body portion form one set, a plurality of the sets with the intermediate rubber layer which is disposed between the sets layered adjacently are provided, each of the sets is composed of different reinforcing layers, in each of the sets, the cords of the reinforcing layers extend in an identical direction, and in the sets layered adjacently, the cords of the reinforcing layers in one of said sets extend in an intersecting direction relative to the cords of the reinforcing layers in the other of said sets, and
the cord angle of each of the reinforcing layers of the body portion being set to 25° or greater and 45° or less in a neutral state where the body is not expanded.

2. The pneumatic fender according to claim 1, wherein a number of sets is 6 or less.

3. The pneumatic fender according to claim 1, wherein, in the neutral state, a thickness of each of the intermediate rubber layers of the body portion is 0.2 mm or greater and less than 1 mm.

4. The pneumatic fender according to claim 3, wherein, in the neutral state, a thickness of the intermediate rubber layer disposed between the different reinforcing layers in each of the sets is less than a thickness of the intermediate rubber layer disposed between the sets layered adjacently.

5. The pneumatic fender according to claim 3, wherein the reinforcing layers of the body portion include the reinforcing layers in each of the sets, and innermost and outermost reinforcing layers respectively provided adjacent to the inner layer rubber and the outer layer rubber.

6. The pneumatic fender according to claim 3, wherein a number of sets is 6 or less.

7. The pneumatic fender according to claim 1, wherein the intermediate rubber layers are disposed between adjacent ones of the reinforcing layers, wherein, in the neutral state, a thickness of the intermediate rubber layer disposed between the different reinforcing layers in each of the sets is less than a thickness of the intermediate rubber layer disposed between the sets layered adjacently.

8. The pneumatic fender according to claim 7, wherein the reinforcing layers of the body portion include the reinforcing layers in each of the sets, and innermost and outermost reinforcing layers respectively provided adjacent to the inner layer rubber and the outer layer rubber.

9. The pneumatic fender according to claim 7, wherein a number of sets is 6 or less.

10. The pneumatic fender according to claim 1, wherein the reinforcing layers of the body portion include the reinforcing layers in each of the sets, and innermost and outermost reinforcing layers respectively provided adjacent to the inner layer rubber and the outer layer rubber.

11. The pneumatic fender according to claim 10, wherein a number of sets is 6 or less.

* * * * *